United States Patent
Basting et al.

(10) Patent No.: US 6,426,966 B1
(45) Date of Patent: Jul. 30, 2002

(54) MOLECULAR FLUORINE ($F_2$) LASER WITH NARROW SPECTRAL LINEWIDTH

(75) Inventors: Dirk Basting, Fort Lauderdale; Sergei V. Govorkov, Boca Raton, both of FL (US); Uwe Stamm, Goettingen (DE)

(73) Assignee: Lambda Physik AG, Goettingen (DE)

( * ) Notice: Subject to any disclaimer, the term of this patent is extended or adjusted under 35 U.S.C. 154(b) by 53 days.

(21) Appl. No.: 09/657,396

(22) Filed: Sep. 8, 2000

Related U.S. Application Data

(63) Continuation-in-part of application No. 09/317,527, filed on May 24, 1999, now Pat. No. 6,154,470
(60) Provisional application No. 60/119,486, filed on Feb. 10, 1999, provisional application No. 60/120,218, filed on Feb. 12, 1999, and provisional application No. 60/212,183, filed on Jun. 16, 2000.

(51) Int. Cl.[7] .............................................. H01S 3/098
(52) U.S. Cl. .............................. 372/19; 372/20; 372/60; 372/99; 372/100; 372/55; 372/57
(58) Field of Search .............................. 372/57, 55, 19, 372/20, 99, 60, 98, 100

(56) References Cited

U.S. PATENT DOCUMENTS

| | | | |
|---|---|---|---|
| 3,806,829 A | 4/1974 | Duston et al. | 331/94.5 |
| 3,868,592 A | 2/1975 | Yarborough et al. | 331/94.5 |
| 4,016,504 A | 4/1977 | Klauminzer | 331/94.5 |
| 4,319,843 A | 3/1982 | Gornall | 356/346 |
| 4,393,505 A | 7/1983 | Fahlen | 372/57 |
| 4,611,270 A | 9/1986 | Klauminzer et al. | 364/183 |
| 4,616,908 A | 10/1986 | King | 350/576 |
| 4,696,012 A | 9/1987 | Harshaw | 372/99 |
| 4,823,354 A | 4/1989 | Znotins et al. | 372/57 |
| 4,829,536 A | 5/1989 | Kajiyama et al. | 372/57 |
| 4,856,018 A | 8/1989 | Nozue et al. | 372/98 |
| 4,905,243 A | 2/1990 | Lokai et al. | 372/32 |

(List continued on next page.)

FOREIGN PATENT DOCUMENTS

JP 2631554 7/1997 ......... H01S/3/1055

OTHER PUBLICATIONS

Kakehata, M. et al., "CTUH15 Experimental Study of Tunability of a Discharge Pumped Molecular Fluorine Laser," *CLEO 90/Tuesday Poster*, pp. 106–108.

(List continued on next page.)

Primary Examiner—Leon Scott, Jr.
(74) Attorney, Agent, or Firm—Sierra Patent Group, Ltd.; Andrew V. Smith

(57) ABSTRACT

A molecular fluorine ($F_2$) laser is provided wherein the gas mixture comprises molecular fluorine for generating a spectral emission including two or three closely spaced lines around 157 nm. An etalon provides line selection such that the output beam only includes one of these lines. The etalon may also serve to outcouple the beam and/or narrow the selected line. Alternatively, a prism provides the line selection and the etalon narrows the selected line. The etalon may be a resonator reflector which also selects a line, while another element outcouples the beam. The etalon plates comprise a material that is substantially transparent at 157 nm, such as $CaF_2$, $MgF_2$, $LiF_2$, $BaF_2$, LiF, $SrF_2$, quartz and fluorine doped quartz. The etalon plates are separated by spacers comprising a material having a low thermal expansion constant, such as invar, zerodur®, ultra low expansion glass, and quartz. A beam expander is preferably provided before the etalon for expanding the beam before the beam is incident on the etalon. The beam expander is preferably configured to reduce the divergence of the beam.

26 Claims, 8 Drawing Sheets

U.S. PATENT DOCUMENTS

| | | | |
|---|---|---|---|
| 4,911,778 A | 3/1990 | Barnoach | 156/466 |
| 4,914,662 A | 4/1990 | Nakatani et al. | 372/32 |
| 4,926,428 A | 5/1990 | Kajiyama et al. | 372/20 |
| 4,975,919 A | 12/1990 | Amada et al. | 372/33 |
| 4,977,563 A | 12/1990 | Nakatani et al. | 372/32 |
| 5,025,445 A | 6/1991 | Anderson et al. | 372/20 |
| 5,081,635 A | 1/1992 | Wakabayashi et al. | 372/57 |
| 5,095,492 A | 3/1992 | Sandstrom | 372/102 |
| 5,142,543 A | 8/1992 | Wakabayashi et al. | 372/32 |
| 5,150,370 A | 9/1992 | Furuya et al. | 372/106 |
| 5,198,872 A | 3/1993 | Wakabayashi et al. | 356/352 |
| 5,218,421 A | 6/1993 | Wakabayashi et al. | 356/352 |
| 5,221,823 A | 6/1993 | Usui | 219/121.78 |
| 5,226,050 A | 7/1993 | Burghardt | 372/20 |
| 5,325,378 A | 6/1994 | Zorabedian | 372/20 |
| 5,373,515 A | 12/1994 | Wakabayashi et al. | 372/20 |
| 5,404,366 A | 4/1995 | Wakabayashi et al. | 372/29 |
| 5,450,207 A | 9/1995 | Fomenkov | 356/416 |
| 5,559,584 A | 9/1996 | Miyaji et al. | 355/73 |
| 5,559,816 A | 9/1996 | Basting et al. | 372/27 |
| 5,646,954 A | 7/1997 | Das et al. | 372/55 |
| 5,684,822 A | 11/1997 | Partlo | 372/95 |
| 5,684,824 A | 11/1997 | Hayakawa | 372/103 |
| 5,761,236 A | 6/1998 | Kleinschmidt et al. | 372/100 |
| 5,763,855 A | 6/1998 | Shioji | 219/121.84 |
| 5,764,678 A | 6/1998 | Tada | 372/57 |
| 5,771,094 A | 6/1998 | Carter et al. | 356/326 |
| 5,811,753 A | 9/1998 | Weick et al. | 219/121.78 |
| 5,856,991 A | 1/1999 | Ershov | 372/57 |
| 5,901,163 A | 5/1999 | Ershov | 372/20 |
| 5,946,337 A | 8/1999 | Govorkov et al. | 372/92 |
| 5,978,391 A | 11/1999 | Das et al. | 372/20 |
| 5,978,394 A | 11/1999 | Newman et al. | 372/32 |
| 6,028,879 A | 2/2000 | Ershov | 372/57 |
| 6,061,382 A | 5/2000 | Govorkov et al. | 372/101 |
| 6,078,599 A | 6/2000 | Everage et al. | 372/20 |
| 6,137,821 A * | 10/2000 | Ershov | 372/19 |
| 6,154,470 A | 11/2000 | Basting et al. | 372/19 |
| 6,240,110 B1 | 5/2001 | Ershov | 372/20 |

OTHER PUBLICATIONS

*Optics and Laser Technology*, vol. 11, No. 6, Dec. 1979, "CIF and $F_2$: two new ultra–violet laser systems," K. Hohla, M. Diegelmann, H. Pummer, K.L. Kompa, 6 pgs.

*Applied Physics B Photo–physics and Laser Chemistry*, vol. B55, No. 1, Jul. 1992, "Influence of Cavity Configuration on the Pulse Energy of a High–Pressure Molecular Fluorine Laser," S.M. Hooker, A.M. Haxell, and C.E. Webb, 6 pgs.

*Highlights Lambdaphysik*, Apr. 1993, "Excimer laser based microstructuring using mask projection techniques," U. Sarbach and H.J. Kahlert, 4 pgs.

"High–power efficient vacuum ultraviolet $F_2$ laser excited by an electric discharge," V.N. Ishchenko, S.A. Kochubei, and A.M. Razhev, 3 pgs.

*Conference on Lasers and Electro–optics*, 1990 Technical Digest Series, vol. 7, May 21–25, 1990, Anaheim, California, "Spectroscopic comparison between low and high pressure discharge pumped Xe atomic lasers," K. Komatsu, E. Matsui, S. Takahashi, Fumiko Kannari, M. Obara, 30 pgs.

*Applied Physics Letters*, vol. 56, Jun. 25, 1990, No. 26, "High specific output energy operation of a vacuum ultraviolet molecular flourine laser excited at 66 MV/cm$^3$ by an electric discharge," Masayuki Kakehata, Etsu Hashimoto, Fumihiko Kannari and Minoru Obara, 6 pgs.

*Journal of Applied Physics*, vol. 50, Jun. 1979, No. 6, "Novel neutral atomic fluorine laser lines in a high–pressure mixture of $F_2$ and He," Shin Sumida, Minoru Obara, and Tomoo Fujioka, 10 pgs.

*IEEE Journal of Quantum Electronics*, Nov. 1991, vol. 27, No. 11, "Efficiency Characterization of Vacuum Ultraviolet Molecular Fluorine ($F_2$) Laser (157 nm) Excited by an Intense Electric Discharge," Masayuki Kakehata, Tatsuya Uematsu, Fumihiko Kannari, and Minoru Obara, 10 pgs.

*Journal of Modern Optics*, vol. 37, No. 4, Apr. 1990, "Amplification characteristics of a discharge excited $F_2$ laser," C. Skordoulis, E. Sarantopoulou, S. Spyrou and A.C. Cefalas, 12 pgs.

*Optics Communications*, vol. 55, No. 6, Oct. 15, 1985, "Gain Measurements at 157 nm in an $F_2$ Pulsed Discharge Molecular Laser," A.C. Cefalas, C. Skordoulis, M. Kompitasas and C.A. Nicolaides, 6 pgs.

*Applied Physics Letters*, vol. 54, Feb. 13, 1989, No. 7, "High–power discharge–pumped $F_2$ molecular laser," Kawakatsu Yamada, Kenzo Miyazaki, Toshifumi Hasama, and Takuzo Sata, 6 pgs.

*Leos '89*, Lasers and Electro–Optics Society Annual Meeting Conference Proceedings, Oct. 17–20, 1989, Orlando, Florida, "High Power Discharge–Pumped $F_2$ Laser," K. Yamada, K. Miyazaki, T. Hasama, T. Sato, M. Kasamatsu, and Y. Mitsuhashi, 13 pgs.

*Journal of Applied Physics*, vol. 53, May 1982, No. 5, "Gain and saturation of the atomic fluorine laser," R. Sadighi-Bonabi, F.W. Lee, and C.B. Collins, 11 pgs.

*Conference on Lasers and Electro–Optics*, 1989 Technical Digest Series, vol. 11, May 24–28, 1989, Baltimore, Maryland, "Intense VUV–XUV generation from rare gas excimers," Wataru Sasaki, Kou Kurosawa, 23 pgs.

*Soviet Journal of Quantum Electronics*, 16(5) May 1986, "High–power efficient vacuum ultraviolet $F_2$ laser excited by an electric discharge," V.N. Ishchenko, S.A. Kochubei, and A.M. Razhev, 9 pgs.

*Optics Communications*, vol. 28, No. 1, Jan. 1979, "Discharge pumped $F_2$ Laser at 1580 Å", H. Pummer, K. Hohla, M. Diegelmann and J.P. Reilly, 6 pgs.

*Gas Flow and Chemical Lasers*, SPIE Vo. 1397, Sep. 10–14, 1990, "Frequency up–conversion of a discharge pumped molecular fluorine laser by stimulated Raman scattering in $H_2$," Masayuki Kakehata, Etsu Hashimoto, Fumihiko Kannari, and Minoru Obara, 16 pgs.

*The Journal of Chemical Physics*, vol. 69, Sep. 15, 1978, "An efficient, high power $F_2$ laser near 157 nm$^{a)}$," Joseph R. Woodworth and James K. Rice, 11 pgs.

*Verhandlungen*, Mar. 1990, Physikertagung Munchen, 1990, Optimierung der VUV–Emission bei 157 nm ($F_2$–Linie) bei entladungs—gepemten Excimerlasern, F. Voss, 2 pgs.

*Tagungsband*, Vom. 24, Bis. 26, Sep. 1991, Abstract: "Vakuum UV Molekullaser mit hoher Ausgangleistung," 3 pgs.

*Applied Physics Letters*, vol. 51, No. 13, Sep. 28, 1997, "Theoretical evaluation of high–efficiency operation of discharge–pumped vacuum–ultraviolet $F_2$ lasers," Mieko Ohwa and Minoru Obara, 6 pgs.

*Applied Optics VUV VI*, vol. 19, No. 23, Dec. 1, 1980, "Vacuum ultraviolet excimer lasers," M.H.R. Hutchinson, 9 pgs.

*Review of Scientific Instruments*, vol. 56, No. 5, Part 1, May 1985, "Simple, compact, high–repetition rate XeCI laser," E. Armandillo, G. Grasso, and G. Salvetti, 7 pgs.

*Applied Physics Letters*, vol. 31, No. 1, Jul. 1, 1977, "vuv emissions from mixtures of $F_2$ and the noble gasses—A molecular $F_2$ laser at 1575 Å$^{(a)}$," James K. Rice, Kay Hays, and Joseph R. Woodwsorth, 5 pgs.

*Applied Physics Letters*, vol. 63, No. 4, Jul. 26, 1993, "Small–signal gain measurements in an electron beam pumped $F_2$ laser," H.M.J. Bastiaens, B.MN.C. van Dam, P.J.M. Peters, and W. J. Witteman, 7 pgs.

ZOS, Akademie der Wissenschaften der DDR, Zentralinstitut fur Optik und Wissenschaften der DDR, Oct. 1987, "Leistungastarker atomarer Fluorlaser im roten Spektralbereich," Jurgen Lademann, Roland Kunig, Wadim Saidow, Rainer Weidauer, 12 pgs.

Discharge–Pumped Excimer Laser Research in Japan, Apr. 1988, "Theoretical simulation of a discharge pumped $F_2$ excimer laser," T. Uematsu et al. Keio U.

*Science Report, Lambdaphysik*, No. 3, Nov. 1990, "Breakthrough in $F_2$Laser Technology," 4 pgs.

Institut Fur Quantenoptik, Oct. 22, 1991, "Stimulated Raman scattering of a $F_2$–Laser in $H_2$," C. Momma, A. Tunnermann, F. Voβ, C. Windolph and B. Wellegehausen, 8 pgs.

*Highlights, Lambdaphysik*, No. 33, Feb. 1992, "VUV Stokes and Anti–Stokes Raman Lines Derived from an $F_2$ Laser," C. Momman, A Tunermann, F. Voβ, C. Windolph, and B. Wellegehausen, 5 pgs.

*Highlights, Lambdaphysik*, No. 43, Jan. 1994, "Photochemical modification of Fluorocarbon Resin to Generate Adhesive Properties," 6 pgs.

*Highlights Lambdaphysik*, No. 29, Jun. 1991, "VUV Spectroscopy by Frequency Tripling," 6 pgs.

"Processing of PTFE with High Power VUV Laser Radiation," D. Basting, U. Sowada, F. Voβ, P. Oesterlin, 3 pgs.

*Journal of Applied Physics*, vol. 81, No. 6, Mar. 1997, "Small–signal gain measurements in a discharge–pumped $F_2$ laser," Tahei Kitamura, Yoshihiko Arita and Keisuke Maeda, Masayuki Takasaki, Kenshi Nakamura, Yoshiano Fujiwara and Shiro Horiguchi, 12 pgs.

*Journal of Applied Physics*, vol. 77, Jan. 1–15, 1995, "Long pulse electron beam pumped molecular $F_2$Laser," F.T.J.L. Lankhorst, H.M.J. Bastiaens, H. Botma, P.J.M. Peters, and W.J. Witteman, 8 pgs.

*Applied Physics*, Vo. B33, No. 4, Apr. 1984, "Intense Laser Generation from an Atomic–Fluorine," I.G. Koprinkov, K.V. Stamenov, and K.A. Stankov, 5 pgs.

*Journal of the Optical Society of America*, vol. 64, No. 4, Apr. 1974, "Modes of a laser resonator containing tilted birefringent plates," Arnold L. Bloom, 7 pgs.

*High Power Laser & Particle Beams*, vol. 6, No. 4, Series No. 24, Nov. 15, 1994.

*SPIE—The International Society for Optical Engineering*, Excimer Beam Applications, vol. 998, Sep. 6, 1988, Boston, Massachusetts, "Narrow–band KrF excimer laser—tunable and wavelength stabilized," Koich Wani, Yoshiro Ogata, Yoshiaki Watari, Takuhiro Ono, Takeo Miyata, Reiji Sano, and Yasuaki Terui, 10 pgs.

*Conference on Lasers and Electro–Optics*, 1989 Technical Digest Series, vol. 11, Apr. 24–29, 1989, Baltimore, Maryland, "Line–narrowed industrial excimer laser for microlithography," R.K. Brimacombe, T.J. McKee, E.D. Mortimer, B. Norris, J. Reid, T.A. Znotins, 24 pgs.

*Applied Optics*, Aug. 1968, vol. 7, No. 8, "Theory of Multiplate Resonant Reflectors," J.K. Watts, 3 pgs.

*Applied Physics*, 1978, "Nitrogen–Laser–Pumped Single–Mode Dye Laser," S. Saikan, 4 pgs.

*Optics Communications*, vol. 14, No. 1, May 1975, "Electronic Tunig of Dye Lasers by an Electrooptic Birefringent Fabry–Perot Etalon," Masakatsu Okada and Shogo Ieiri, 7 pgs.

R.B. Green, et al., "Galvanic Detection of Optical Absorption in a Gas Discharge," *Applied Physics Letters*, Dec. 1, 1976, vol. 29, No. 11, pp. 727–729.

R.A. Keller, et al., "Opto–galvanic Spectroscopy in a Uranium Hollow Cathode Discharge," *J. Opt. Soc. Am.*, May 1979, vol. 69, No. 5, pp. 738–742.

Richard A. Keller, et al., "Atlas for Optogalvanic Wavelength Calibration," *Applied Optics*, Mar. 15, 1980, vol. 19, No. 6, pp. 836–837.

Norman J. Dovichi, et al., "Use of the Optogalvanic Effect and the Uranium Atlas for Wavelength Calibration of Pulsed Lasers," *Applied Optics*, Apr. 15, 1982, vol. 21, No. 8, pp. 1468–1473.

P. Camus, "Atomic Spectroscopy with Optogalvanic Detection," *Journal De Physique*, (Paris) Nov. 1983, IIC7, pp. C7–87–106.

Marilyn J. Dodge, "Refractive Properties of magnesium Flouride," *Applied Optics*, vol. 23, No. 12, Jun. 15, 1984, pp. 1980–1985.

F. Babin, et al., "Ultraviolet Optogalvanic Laser Spectroscopy of Iron for Reference Wavelengths," *Optics Letters*, Jul. 1987, vol. 12, No. 7, pp. 468–470.

W. Muckenheim, et al., "Seven Ways to Combine Two Excimer Lasers," reprinted from Jul. 1987 edition of *Laser Focus/Electro–Optics*.

W. Muckenheim, et al., "Excimer Laser with Narrow Linewidth and Large Internal Beam Divergence," *J. Phys. E. Sci. Instrum.*, 20, 1987, 1934–1935.

R. Sandstrom, "Argon Fluoride Excimer Laser Source for Sub–0.25 mm Optical Lithography," *Optical/Laser Microlithography IV*, 1991, vol. 1463, pp. 610–616.

H.J. Eichler, et al., "Effective Etalon Reflectors with High Damage Threshold for Erbium Laser Development," *CLEO '96—Conference on Lasers and Electro–Optics*, pp. 147–148.

G. Grunefeld, et al., "Operation of KrF and ArF Tunable Excimer Lasers without Cassegrain Optics," *Applied Physics B*, vol. 62, 1996, pp. 241.

T. Hofmann, et al., "Revisiting the F2 Laser for DUV Microlithography," *Proceedings of SPIE: Optical Microlithography XII*, vol. 3679, Mar. 14–19, 1999, Santa Clara, CA, USA, pp. 541–546.

Uwe Stamm, et al., "Excimer Laser for 157 nm Lithography," *24$^{th}$ International Symposium on Microlithography*, Mar. 14–19, 1999, Santa Clara, CA, USA, pp. 816–826.

T. Hofmann, et al., "Prospects of High Repetition Rate F2 (157 nm) Laser for Microlithography," *International SEMATECH Workshop*, Feb. 15–17, 1999, Litchfield, AZ, USA.

Uwe Stamm, et al., "Status of 157 nm Excimer Laser," *International SEMATCH Workshop*, Feb. 15–17, 1999, Litchfield, AZ, USA.

* cited by examiner

MOLECULAR FLUORINE (F₂) LASER WITH NARROW SPECTRAL LINEWIDTH

PRIORITY

This Application is a Continuation-in-Part of U.S. patent application Ser. No. 09/317,527, filed May 24, 1999, now U.S. Pat. No. 6,154,470 which claims the benefit of priority to U.S. Provisional Applications No. 60/119,486, filed Feb. 10, 1999, and 60/120,218, filed Feb. 12, 1999, and this application claims the benefit of priority to U.S. Provisional Application No. 60/212,183, filed Jun. 16, 2000 each of applications being incorporated herein by reference.

BACKGROUND OF THE INVENTION

1. Field of the Invention

The invention relates to a molecular fluorine ($F_2$) laser, and particularly to an $F_2$-laser having enhanced efficiency, line selection and line narrowing of the selected line.

2. Discussion of the Related Art

Semiconductor manufacturers are currently using deep ultraviolet (DUV) lithography tools based on KrF-excimer laser systems operating around 248 nm, followed by the next generation of ArF-excimer laser systems operating around 193 nm. Vacuum UV (VUV) lithography may use the $F_2$-laser operating around 157 nm.

The emission of the $F_2$-laser includes at least two characteristic lines around $\lambda_1 = 157.629$ nm and $\lambda_2 = 157.523$ nm. Each line has a natural linewidth of around 15 pm (0.015 nm). The intensity ratio between the two lines is $I(\lambda_1)/I(\lambda_2)$ 0.7. See V. N. Ishenko, S. A. Kochubel, and A. M. Razher, Sov. Journ. QE-16, 5 (1986). FIG. 1 illustrates the two above-described closely-spaced peaks of the $F_2$-laser spontaneous emission spectrum.

Integrated circuit device technology has entered the submicron regime, thus necessitating very fine photolithographic techniques. Line narrowing and tuning is required in KrF- and ArF-excimer laser systems due to the breadth of their natural emission spectra (>100 pm). Narrowing of the linewidth is achieved most commonly through the use of a wavelength selector consisting of one or more prisms and a diffraction grating (Littrow configuration). However, for an $F_2$-laser operating at a wavelength of approximately 157 nm, use of a reflective diffraction grating may be unsatisfactory due to its low reflectivity and high oscillation threshold at this wavelength. In this regard, a master oscillator-power amplifier design has been proposed by two of the Applicants of the present application (see U.S. patent application Ser. No. 09/599,130, which is assigned to the same assignee as the present application and is hereby incorporated by reference) for improving the power of the output beam and enabling very narrow linewidths (<1 pm), e.g., using a diffraction grating and or etalons, each preferably in combination with a beam expander. The tunability of the $F_2$-laser has been demonstrated using a prism inside the laser resonator. See M. Kakehata, E. Hashimoto, F. Kannari, M. Obara, U. Keio Proc. of CLEO-90, 106 (1990).

$F_2$-lasers are also characterized by relatively high intracavity losses, due to absorption and scattering in gases and all optical elements, particularly in oxygen and water vapor which absorb strongly around 157 nm. The short wavelength (157 nm) is responsible for the high absorption and scattering losses of the $F_2$-laser, whereas the KrF-excimer laser operating at 248 nm does not experience such losses. Therefore, the advisability of taking steps to optimize resonator efficiency is recognized in the present invention. In addition, output beam characteristics are more sensitive to temperature induced variations effecting the production of smaller structures lithographically at 157 nm, than those for longer wavelength lithography such as at 248 nm.

SUMMARY OF THE INVENTION

It is therefore an object of the invention to provide a $F_2$-laser wherein one of the plural emission lines around 157 nm is efficiently selected.

It is a further object of the invention to provide the above $F_2$-laser with efficient means for narrowing the selected line.

Therefore, the present invention provides a $F_2$-laser wherein one of the plural lines of its output emission spectrum around 157 nm is selected, e.g., $\lambda_1$ (see above), for its use in lithography systems. The present invention also includes, and provides means for, narrowing the linewidth of the selected line. More specifically, the present invention uses a first etalon for selecting one of the plural lines around 157 nm of the $F_2$-laser, which also functions to narrow the selected line. Alternatively, the first etalon performs line selection and another optical element such as a second etalon narrows the selected line. Also, alternatively, another element such as a second etalon, a prism, a grating or a birefringent plate selects the line and the first etalon narrows the selected line. Also, a first etalon and a second optical element such as a second etalon, prism or prisms, a birefringent plate or a grating may be used in combination to select and narrow the primary line (i.e., $\lambda_1$). The first and/or second etalons may be used in reflective mode as a resonator reflector component or in transmissive mode disposed between the resonator reflectors of the laser system.

In a preferred arrangement, a transmissive etalon is disposed after a prism beam expander in the laser resonator. A highly reflective (HR) resonator reflector follows the etalon. Alternatively, the etalon also functions as the HR resonator reflector. Also, the prism beam expander and etalon may be on the outcoupling side of the laser chamber, wherein the etalon may be transmissive followed by a partially reflecting outcoupler mirror or the etalon may function as the outcoupler. One of the resonator reflectors, e.g., that which is also usd to outcouple the beam, may also be used to seal the laser chamber as a window on the chamber, thereby providing a more efficient laser resonator. The line-narrowing unit including the etalon and the prism beam expander is preferably in an inert gas purged module that is substantially free of species that photoabsorb radiation around 157 nm.

When two etalons are used, preferably one of the etalons is used for line selection and the other for narrowing of the selected line, or the two are used together for line selection and narrowing of the selected line. Also, one of the etalons may be used for output coupling or as a highly reflective resonator reflector, or one may be used for output coupling and the other as a highly reflective resonator reflector, such as would be configured for use in reflective mode, or one or both may be used in transmissive mode.

The gas mixture pressure and components and their concentrations are selected for improved operation of the laser, including preferably using neon as a buffer gas, either as the sole buffer gas or in combination with helium as a second buffer gas, having a total pressure less than 5 bars and a having a fluorine concentration in a range between 0.05% and 0.20%. The number of optical interfaces, i.e., optical elements, in the resonator is reduced, and the materials and other properties comprising the optical elements and laser gas are selected to provide enhanced output beam characteristics.

The etalon plates preferably comprise a material having a substantial transmissivity at 157 nm, such as $CaF_2$, $MgF_2$, $LiF_2$, $BaF_2$, $SrF_2$, quartz and fluorine doped quartz. The etalon plates are separated by one, two or preferably three spacers comprising a material having a low thermal expansion constant, such as invar, zerodur, ultra low expansion glass, or quartz. A gas, such as helium, another inert gas such as krypton, neon, argon or nitrogen, or generally a gas that does not absorb radiation strongly at 157 nm, or a solid such as one of those mentioned above for the plates fills the gap between the etalon plates, or the gap is evacuated. The etalon may be piezo-electrically tuned, or rotationally tuned, or pressure tuned.

BRIEF DESCRIPTION OF THE DRAWINGS

FIG. 3b illustrates an additional line-narrowing feature of the outcoupler etalon of FIG. 3a.

FIG. 5b shows the emission spectrum of the free-running $F_2$-laser without line selection or line narrowing (solid line) and with line selection and line narrowing (dashed line) performed by the outcoupler etalon of FIG. 5a.

FIG. 10a shows the reflectivity spectrum of the high finesse etalon of either of FIGS. 9a or 9b in accord with the present invention.

FIG. 10b shows the free running output emission spectrum of an $F_2$-laser.

FIG. 10c shows the output emission spectrum of the $F_2$-laser whose free-running output emission spectrum is shown in FIG. 10b after line selection is performed by the high finesse etalon whose reflectivity spectrum is shown in FIG. 10a.

DETAILED DESCRIPTION OF THE PREFERRED EMBODIMENT

Figure 2A:
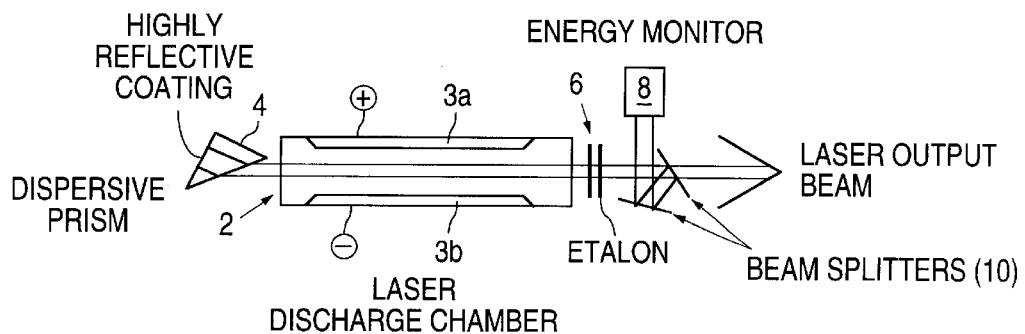
FIG. 2a shows a first preferred embodiment of a $F_2$-laser in accord with the present invention.
Figure 2B:
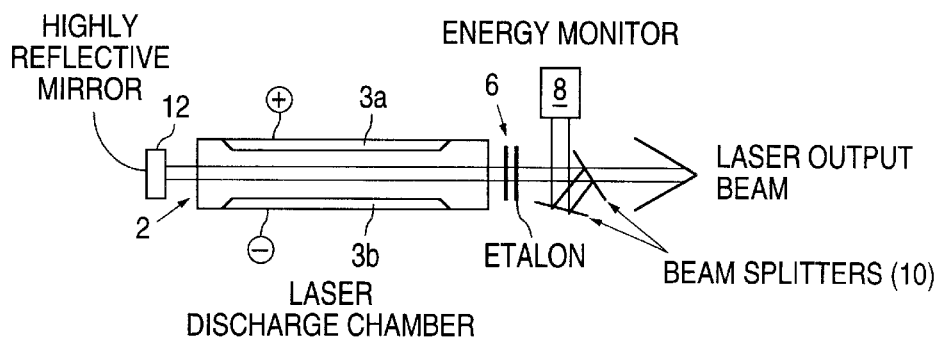
FIG. 2b shows a second preferred embodiment of the present invention.

FIGS. 2a and 2b show a first and a second preferred embodiments of a $F_2$-laser resonator in accord with the present invention. It is understood that the overall $F_2$-laser system includes other components in addition to those shown at FIGS. 2a–2b, for providing an output beam with high energy stability and high wavelength and bandwidth stabilities. For example, the preferred $F_2$-laser system includes a power supply and a solid-state pulser module for energizing the laser gas filling the discharge chamber 2.

In addition, a gas handling and supply module is included for controlling the composition of gases in the laser chamber 2. A diagnostic module is further included for monitoring the energy of the laser pulses or the energy dose or moving average of the energies of the laser pulses, and for monitoring the wavelength and/or bandwidth of the beam. The diagnostic module may be used to monitor a parameter that is indicative of the concentration of molecular fluorine in the laser chamber, such that a processor can be used in a feedback arrangement with the gas handling module to maintain a desired gas mixture composition.

The processor is also used to control the power supply such that selected voltages are applied to the main laser electrodes 3a and 3b and preionization electrodes (not shown). An optics control module adjusts optics of the laser resonator for wavelength and/or bandwidth tuning, e.g., in a feedback arrangement with the processor and diagnostic module. The processor also preferably communicates with an interface unit of an imaging system and/or stepper/scanner module control computer or computers.

In accordance with the above, the following are hereby incorporated by reference into the present application as disclosing preferred or alternative features of an overall $F_2$-laser system and alternative embodiments of elements or features of preferred resonator embodiments described herein:

U.S. patent application Ser. Nos. 09/317,527, 09/343,333, 09/453,670, 09/447,882, 09/317,695, 09/574,921, 09/559,130, 60/122,145, 60/140,531, 60/140,530, 60/162,735, 60/166,952, 60/171,172, 09/453,670, 60/184,705, 60/128,227, 60/141,678, 60/173,993, 60/166,967, 60/172,674, 60,162,845, 60/160,182, 60/127,237, 09/535,276, 09/247,887, 60/181,156, 60/149,392, 60/198,058, 09/390,146, 09/131,580, 09/432,348, 60/204,095, 09/172,805, 60/172,749, 60/166,952, 60/178,620, 09/416,344, 60/186,003, 60/158,808, 09/484,818, 09/317,526, 60/124,785, 09/418,052, 09/379,034, 60/171,717, 60/159,525, 09/513,025, 60/124,785, 60/160,126, 09/418,052, and 60/186,096, and U.S. Pat. Nos. 6,005,880, 6,014,206, 4,393,405, 4,977,573, 4,905,243, 5,729,565, 4,860,300, 6,020,723, 5,396,514, each of which is assigned to the same assignee as the present application; and U.S. Pat. Nos. 5,901,163, 5,978,406, 6,014,398, 6,028,880, 5,559,584, 5,221,823, 5,763,855, 5,811,753, 4,616,908, 4,691,322, 5,535,233, 5,557,629, 5,337,330, 5,818,865, 5,991,324, 5,982,800, 5,982,795, 5,940,421, 5,914,974, 5,949,806, 5,936,988, 6,028,872, 5,729,562, 5,978,391, 5,450,207, 4,926,428, 5,748,346, 5,025,445, and 5,978,394, and other references set forth in the priority or background sections of the application, or below in the detailed description.

A general description of the line-narrowing optics that may be used in the preferred embodiment, or alternatives and/or variations of elements or features thereof, is provided here. Line-narrowing optics may be provided on either side of the discharge chamber 2, and may include, e.g., one or more of a beam expander, one or more etalons, a diffraction grating and/or a birefringent plate, for use with a line-narrowed $F_2$-laser such as is used with a refractive or catadioptric optical lithography imaging system, or with an all-reflective imaging system. The line-narrowing package may include a beam expander and one or more etalons followed by an HR mirror as a resonator reflector.

One or more apertures may be included in the resonator for blocking stray light and matching and/or reducing the divergence of the resonator. As mentioned above, the line-narrowing optics may be provided on the output coupling side of the laser chamber 2 (see the Ser. Nos. 60/166,277, 60/173,993 and 60/166,967 applications, each being assigned to the same assignee and hereby incorporated by reference), including or in addition to the outcoupler element.

A beam expander of the line-narrowing optics preferably includes one or more prisms. The beam expander may include other beam expanding optics such as a lens assembly or a converging/diverging lens pair. A grating, etalon or etalons or highly reflective mirror may be rotatable so that the wavelengths propagating within the acceptance angle of the resonator can be selected or tuned. Alternatively, the grating, etalon or etalons, or other optic or optics, or the entire line-narrowing module may be pressure tuned, such as is set forth in the Ser. Nos. 60/178,445 and 09/317,527 applications, each of which is assigned to the same assignee and is hereby incorporated by reference. When a grating is used, it is preferred to use an amplifier after the laser oscillator to increase the power of the beam. One or more dispersive prisms may also be used, and more than one etalon may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, and 5,946,337, and U.S. patent applications Ser. Nos. 09/317,695, 09/130,277, 09/244,554, 09/317,527, 09/073,070, 60/124,241, 60/140,532, 60/147, 219 and 60/140,531, 60/147,219, 60/170,342, 60/172,749, 60/178,620, 60/173,993, 60/166,277, 60/166,967, 60/167, 835, 60/170,919, 60/186,096, each of which is assigned to the same assignee as the present application, and U.S. Pat. Nos. 5,095,492, 5,684,822, 5,835,520, 5,852,627, 5,856, 991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, are each hereby incorporated by reference into the present application.

In all of the above and below embodiments, the material used for the prisms of the beam expanders, etalons, laser windows and the outcoupler is preferably one that is highly transparent at wavelengths below 200 nm, such as at the 157 nm output emission wavlength of the molecular fluorine laser. The materials are also capable of withstanding long-term exposure to ultraviolet light with minimal degradation effects. Examples of such materials are CaF2, MgF2, BaF, BaF2, LiF, LiF2, and SrF2, and in some cases quartz or fluorine-doped quartz may be used. Also, in all of the embodiments, many optical surfaces, particularly those of the prisms, preferably have an anti-reflective coating on one or more optical surfaces, in order to minimize reflection losses and prolong their lifetime. A highly reflective dielectric coating may be used on surfaces wherein it is desired to have a high degree of reflection, e.g., a highly reflective resonator reflector or internal surfaces of an etalon.

A line-narrowed oscillator, e.g., a set forth above, may be followed by a power amplifier for increasing the power of the beam output by the oscillator. Preferred features of the oscillator-amplifier set-up are set forth at U.S. patent application Ser. No. 09/559,130, which is assigned to the same assignee and is hereby incorporated by reference. The amplifier may be the same or a separate discharge chamber 2. An optical or electrical delay may be used to time the electrical discharge at the amplifier with the reaching of the optical pulse from the oscillator at the amplifier.

Turning to FIG. 2a, the $F_2$-laser of the first embodiment includes a discharge chamber 2 filled with a laser gas including molecular fluorine and having main electrodes 3a and 3b coupled with a power supply circuit such that a voltage is applied across the electrodes 3a,3b to create a pulsed discharge. UV-preionization of the electrical discharge laser is also provided and may be realized by means of an array of spark gaps or by another source of UV-radiation (surface, barrier or corona gas discharges), disposed in the vicinity of at least one of the solid electrodes of the main discharge of the laser. Preferred preionization unit are described in U.S. patent Applications Ser. Nos. 09/247,887 and 60/162,845, each of which is assigned to the same assignee and is hereby incorporated by reference into this present application.

A dispersive prism 4 has a highly reflective coating at its back surface and serves as a highly reflective resonator reflector. An etalon 6 serves as an output coupler of the beam. The prism 4 may also serve to seal one end of the discharge chamber 2, while the etalon 6 also serves to seal the other end of the discharge chamber 2. Also, one of the etalon 6 and the prism 4 may serve to seal one end of the discharge chamber 2 while the other end is sealed by a window. A partially reflecting resonator reflector mirror may seal one end of the discharge chamber 2.

An energy monitor 8 is included in the first embodiment and measures the energy of the output beam of the laser. Beam splitters 10 are also shown. One or more apertures (not shown) may also be inserted into the resonator to chop off sidebands of the dispersion spectrum of the prism 4 and/or of the superposition of the etalon 6 reflectivity maximum with the selected line of the $F_2$-laser. The aperture (s) can have dimensions which approximate the diameter of the laser beam (see U.S. Patent application Ser. No. 09/130, 277 and U.S. Pat. No. 5,161,238). The apertures reduce the amount of amplified spontaneous emission generated in the gas discharge chamber 2. It is advantageous to chop out this otherwise parasitic emission because it does not generally possess the characteristics of desired laser oscillations. Therefore, if not excluded by an aperture, such parasitic emission can deteriorate the quality including the spectral purity and divergence of the output beam. Generally, any of the embodiments described herein may be varied by adding one or more apertures for excluding this parasitic emission.

Based partially on the energy measured using the energy monitor 8, the power supply voltage applied between the main electrodes 3a and 3b within the discharge chamber 2 and concentrations of constituents of the laser gas mixture are controlled to adjust characteristics of the output beam, including its energy. In the first preferred embodiment, line selection is achieved through the use of the dispersive prism 4.

Figure 1:
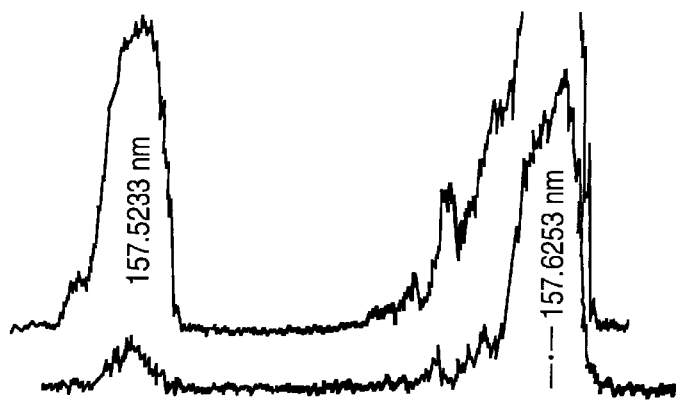
FIG. 1 shows an emission spectrum of an $F_2$-laser without line selection or narrowing.

The prism 4 is preferably rotatable or tiltable to adjust the range of wavelengths it reflects within the acceptance angle of the resonator. The prism may be oriented to include only one of the multiple emission lines of the $F_2$-laser (see, e.g., FIGS. 1 and 6a–6b). More than one dispersion prism may be included and a beam expander may be provided before the dispersion prism 4. Also, a dispersion prism 4 may be disposed before a resonator reflector highly reflective or partially reflective mirror.

Due to the wavelength dependent nature of the refractive index of the material of the prism 4, light entering the prism 4 is refracted according to wavelength at various angles. Only a line having a wavelength within a particular range of wavelengths that exit the prism 4 within the acceptance angle of the resonator of the laser will later be outcoupled as the output laser beam. In other words, after retroreflecting from the highly reflecting surface at the back of the prism 4, or the highly reflective mirror disposed after the prism, lines of different wavelengths will enter the discharge chamber at different angles to the optical axis of the resonator. Lines having wavelengths within the range of wavelengths reflected within the acceptance angle of the resonator are selected, and all others are not selected or suppressed. The prism may be adjusted so that a desired center wavelength may be aligned parallel to the optical axis so that it suffers the least optical losses and, therefore, dominates the output. This center wavelength is at or near the center of the $F_2$-emission line it is desired to select.

Line narrowing is provided by the etalon 6 that also may serve as an outcoupler. The etalon 6 may also be provided before a highly or partially reflective resonator reflector mirror. The etalon 6 has preferably a low finesse. The reflecting inner surfaces of the plates of the etalon 6 may exhibit, e.g., a reflectivity around 4–6%, such that a maximum reflectivity of the etalon may be from 16% to 24%. The reflectivity may, however, be somewhat increased/decreased to increase/decrease the overall gain of the $F_2$-laser, as desired.

An alternative embodiment may also be realized using one or more apertures with a dispersive element such as preferably a prism, and alternatively a grating. An aperture may be used for line selection when the prism is dispersing the emission of the $F_2$-laser. The selected line traverses the aperture, and the unselected line is blocked by the aperture. An etalon or prism may then be used for narrowing of the selected line.

Figure 3A:
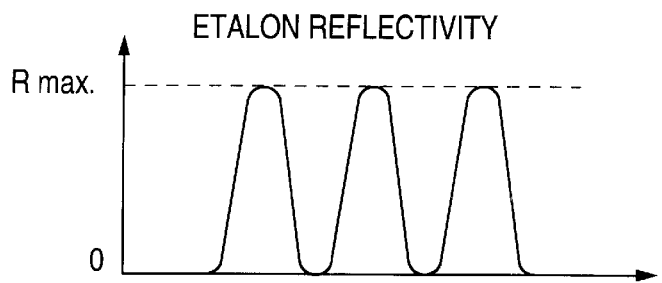
FIG. 3a illustrates the periodic wavelength dependence of the reflectivity function of an outcoupler etalon in accord with the present invention.
Figure 3B:
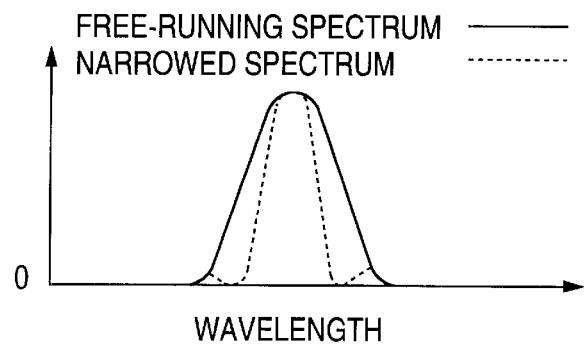

Referring back to the first embodiment of FIG. 2a, a single spectral line is selected by the prism 4 and the selected line is narrowed by the optical etalon 6. FIGS. 3a and 3b illustrate how this line narrowing is achieved. The reflectivity function R of the etalon 6 versus the optical wavelength of incident light, in this case around 157 nm, is shown in FIG. 3a. The reflectivity function may be approximately represented by a sinusoidal function such as:

$$R(v) \sim 1 + \sin(2Bv/v_0),$$

where $v_0$ is the free spectral range (FSR) of the etalon 6, $v_0 = 1/2\ nL\ [cm^{-1}]$, where n is the refractive index of the material within the gap between the plates of the etalon 6 and L is the spacing of the etalon plates in centimeters. Those spectral components having frequencies close to the minimum of the etalon's 6 reflectivity R suffer the greatest losses in the resonator and are thus suppressed. Therefore, if the FSR of the etalon is approximately equal to, but is somewhat less than, the linewidth of the selected line of the free running laser, the output linewidth is narrowed. The FSR should not be much less than the free running linewidth, in order to prevent sidebands from developing in adjacent interference orders.

FIG. 3b shows a solid line representing the free-running linewidth of the selected line of the $F_2$-laser. The etalon reflectivity function of FIG. 3a is superimposed on the selected line. The resulting narrowed line is shown as a broken line in FIG. 3b. As noted above, if the FSR is too small then there will be significant overlap of the outer peaks of the reflectivity spectrum of FIG. 3a with the selected line. If "parasitic" sidebands are allowed to resonate, then beam quality may be deteriorated. When there is a dispersive element in the resonator, such as the prism 4 or another prism or prisms or a grating, the selected line may be narrowed further by reducing the width of the reflectivity maxima of the etalon 6, such that the etalon 6 does not suppress the sidebands, while apertures are placed within the resonator to chop off the sidebands, ultimately resulting in a very narrow, high quality output beam.

Figure 4:
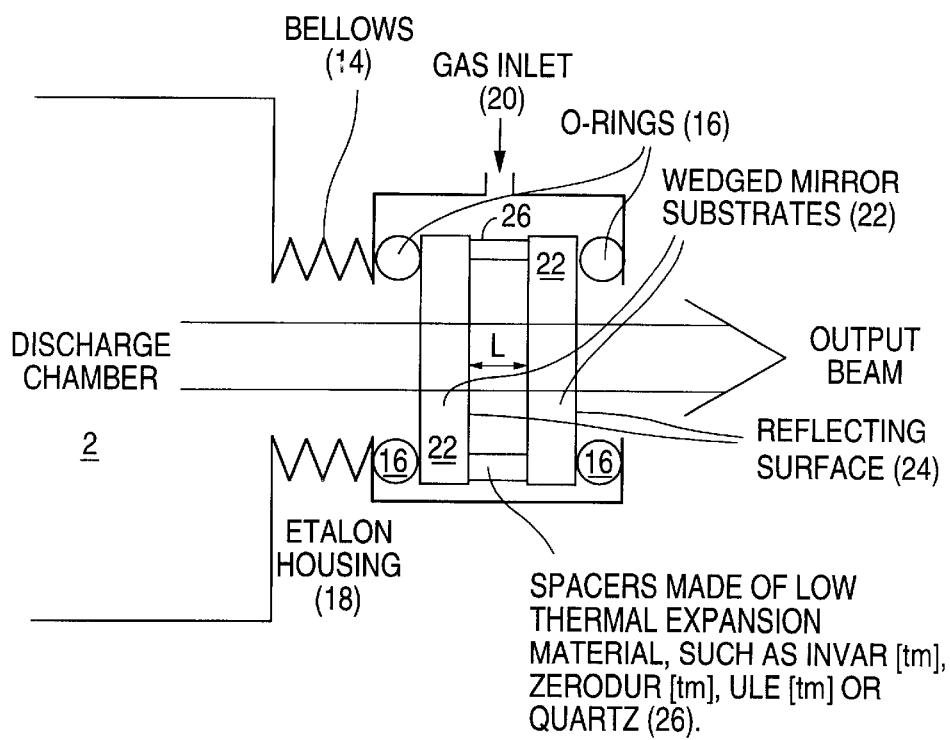
FIG. 4 shows an etalon as an outcoupler and a window of an $F_2$-laser in accord with the present invention.

FIG. 4 shows an enlarged and more detailed view of a pressure-tuned outcoupler etalon 6 which may be used with either of the first and second embodiments of FIGS. 2a and 2b. Alternatively, a solid etalon may be used, but the etalon shown in FIG. 4 having two plates separated by an air gap is preferred because the etalon reflectivity spectrum of the etalon of FIG. 4 may be adjusted by adjusting the pressure of the gas between the etalon plates (see below), or by adjusting the gap spacing. Any of these etalons may be rotatably tuned. FIG. 4 shows that the etalon 6 is preferably acting to both seal the discharge chamber 2 and as a window, in order to eliminate the lossy optical interfaces of an additional optical window sealing the chamber 2, and to reduce the overall size of the resonator setup. The etalon 6 may seal the chamber 2 via a bellows 14 and an o-ring 16, as shown in FIG. 4, in an exemplary embodiment.

The etalon 6 is shown encased within a housing 18. A gas inlet 20 is preferably provided for allowing one or more of gases such as helium (preferred), neon, krypton, argon, nitrogen, another inert gas or another gas that does not strongly absorb around 157 nm, to fill the housing 18 at a selected pressure. The housing is equipped with conventional means for measuring the pressure of the gas within it. Also, the gas inlet 20 may be used to pump the housing, including the gap between the plates 22 of the etalon 6, to a low pressure using a mechanical pump. Solid material such as $CaF_2$, $MgF_2$, $LiF_2$, $BaF_2$, $SrF_2$, quartz and fluorine doped quartz, or another solid material that does not absorb strongly around 157 nm may also fill the gap between the plates of the etalon 6. The reflecting interior surfaces of the plates 22 of the etalon 6 may be coated with a reflective film or may be left uncoated. The spacers 26 comprise a low thermal expansion material such as invar™, zerodur, ultra low expansion (ULE™ glass) or quartz, or another material having a low constant of thermal expansion, such that the gap thickness L is least sensitive to temperature. This is advantageous because the reflectivity function of the etalon 6 depends on the gap spacing.

The following is an estimate of the preferred etalon gap thickness L. Since the linewidth of the free running $F_2$-laser is about 1 pm and the wavelength is approximately 157 nm, the FSR should be approximately 0.4 $cm^{-1}$. This means that the etalon spacing L should be 8.3 mm if the gap between the plates is filled with a solid material with a refractive index of around 1.5 (such as $MgF_2$, $CaF_2$, $LiF_2$, $BaF_2$, $SrF_2$, crystalline quartz or fluorine-doped quartz). Alternatively, and as discussed in more detail above, the etalon 6 can have its gap filled with an inert gas such as helium, in which case its thickness should be approximately 12.5 mm. Both of these spacings L are readily achievable. Use of the solid materials such as $MgF_2$, $CaF_2$, $LiF_2$, LiF, $BaF_2$, $SrF_2$ or crystalline or fluorine doped crystalline quartz for the plates of the etalon and/or to fill the gap is due in part to fact that these materials are mostly transparent to light at around a wavelength of 157 nm.

As alluded to above, an etalon design consideration is the desire for stability of the etalon frequency reflectivity maxima and minima with respect to the variations of ambient conditions, such as the temperature. For example, $MgF_2$ has a linear expansion coefficient of $13.7 \times 10^{-6} K^{-1}$ along the c-axis, and a temperature index coefficient of $1.47 \times 10^{-6} K^{-1}$ for an ordinary beam. This means that in order to maintain the centering of the spectral line with respect to a maximum of the reflectivity function R(v), e.g., within 10% of FSR, one should stabilize the temperature to within 0.06 K. If $CaF_2$ is used, then the stability should be within 0.05 K.

The present invention provides this stability by using low thermal expansion materials for its spacers. It also does so by providing the outcoupler etalon 6 of the first or second embodiments of FIGS. 2a or 2b, respectively, with two plates separated by a gap within the housing described above preferably filled with an inert gas, such as one or a combination of the gases mentioned above, wherein the pressure of the gas is controlled to control the index of refraction of the gas and thus the center wavelength of the aligned peak of the reflectivity function of the etalon. For inert gases such as nitrogen, the refractive index changes by approximately 300 ppm per 1 bar of pressure. Therefore, with the spacing between reflecting surfaces L=12.5 mm, frequency control within 10% of the FSR requires pressure control within 2 mbars of resolution. As discussed, the first reason to use helium in the pressure-tuned etalon 6, or alternatively nitrogen, argon or other inert gases or vacuum is because air is not transparent at the 157 nm wavelengths of interest, primarily due to the presence of oxygen, water vapor and carbon dioxide in the air, each of which strongly absorbs around 157 nm.

Additionally, the internal surfaces of the outcoupler etalon 6 may either be coated with partially reflective coatings, or may be uncoated. In the latter case, the reflectivity of each surface is approximately 4 to 6% which results in a maximum reflectivity of the etalon from 16% to 24%. Alternatively, a dielectric coating may be provided for high reflectivity such that each surface exhibits high reflectivity such as above 50% and perhaps as high as 90% or higher, e.g., up to 97%. Similar considerations apply to the solid etalon.

The second embodiment of FIG. 2b is similar to the first embodiment of FIG. 2a, and differs in that the prism 4 of FIG. 2a is replaced in FIG. 2b by a highly reflective mirror 12. The highly reflective mirror 12 may seal one end of the discharge chamber and/or the etalon 6 may seal the other end of the discharge chamber. In the second embodiment, the etalon 6 provides the line selection function, obviating the prism 4 of the first embodiment of FIG. 2a. An advantage of the second embodiment over the first embodiment is simplicity, fewer elements in the resonator and fewer optical interfaces for the beam to traverse which leads to reduced optical losses and increased lifetime. However, suppression of the second line may be less efficient in the second embodiment than in the first embodiment.

In the second embodiment, the etalon 6 is used for both line selection and simultaneously, for narrowing the selected single line, in a fashion similar to that described above with respect to the first embodiment. The line selection is achieved by adjusting the FSR and the wavelength of the maximum reflectivity of the etalon in such a way that the reflectivity at the desired wavelength is maximized, and the reflectivity at the wavelength of other non-selected lines is at its minimum. This line selection is described in greater detail below. The etalon 6 also outcouples the beam as it did in the first embodiment.

The FSR of the etalon 6 of the first and second embodiments, or more generally that of any gas-filled etalon used with the $F_2$-laser of the present invention, such as the etalon 6 of FIGS. 8a, 8b or 9a or the etalon 34 of FIGS. 9a–9b (below), may be adjustable in the following manner. The pressure of the gas filling the etalon housing 18 (see FIG. 4), and particularly the gas between the plates 22 of the etalon 6, may be varied to adjust the index of refraction of the gas. Alternatively, the spacing L between the plates 22 can be varied, e.g., using piezo elements as etalon spacers 26. By either of these methods, the FSR can be adjusted because the FSR depends on both the index of refraction of the gas and the spacing L between the plates 22. By adjusting the FSR of the etalon 6, line selection may be precisely performed by aligning a maximum in the reflectivity spectrum of the etalon 6 with the desired line to be selected, and by contemporaneously aligning a minimum of the reflectivity spectrum of the etalon 6 with the unselected line of the free-running $F_2$-laser. Any etalons used in the preferred embodiment may also be piezo-electrically tuned or rotationally tuned for adjusting the FSR.

Figure 5A:
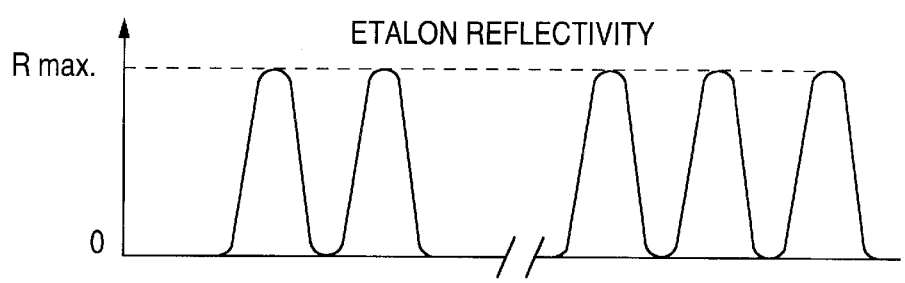
FIG. 5a shows the wavelength dependence of the reflectivity of an outcoupler etalon, in accord with the present invention, in the vicinity of the free-running $F_2$-laser emission lines $\lambda_2$ (left part) and $\lambda_1$ (right part) around 157 nm.
Figure 5B:
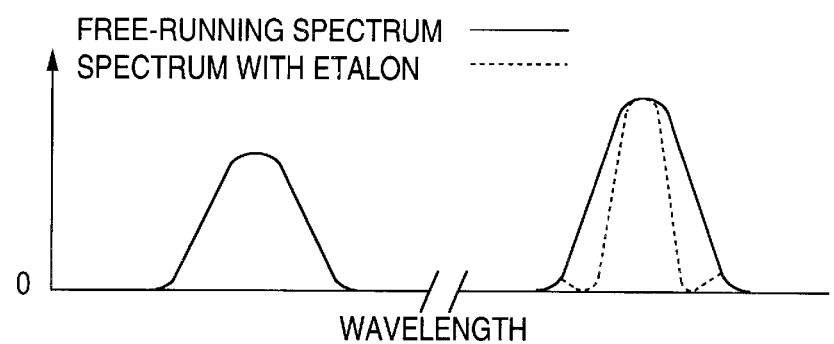

FIGS. 5a and 5b illustrate schematically how the line narrowing is performed by the etalon 6. As discussed quantitatively below, the FSR of the etalon 6 is adjusted by either changing its gap spacing, or by varying pressure of the gas in the gap, as has been described above. The requirements to the pressure resolution derived above, also apply to this case. The advantage of this configuration is simplicity, since no prism is required for line selection. However, the system may be less efficient at suppressing the unwanted lines, leading to residual emission at those wavelengths.

The reflectivity spectrum of the etalon 6 in the vicinity of the free-running $F_2$-laser emission lines $\lambda_2$ (left part) and $\lambda_1$ (right part) around 157 nm is shown in FIG. 5a. Preferably the pressure of the gas filling the gap of the etalon 6 is varied to align reflectivity maxima and minima with $\lambda_1$ and $\lambda_2$, respectively. Alternatively, the gap spacing may be varied or both the pressure and gap spacing may be varied to produce the same effect. FIG. 5b shows $\lambda_2$ (left part) and $\lambda_1$ (right part) of the free running $F_2$-laser (solid line), and the output emission spectrum of the $F_2$-laser with line selection ($\lambda_1$) and narrowing of the selected line (dashed line). That is, the dashed line of FIG. 5b represents the reflectivity spectrum of FIG. 5a of the etalon 6 superimposed over the solid line of FIG. 5b, which is the output emission spectrum of the free running $F_2$-laser.

Figure 6A:
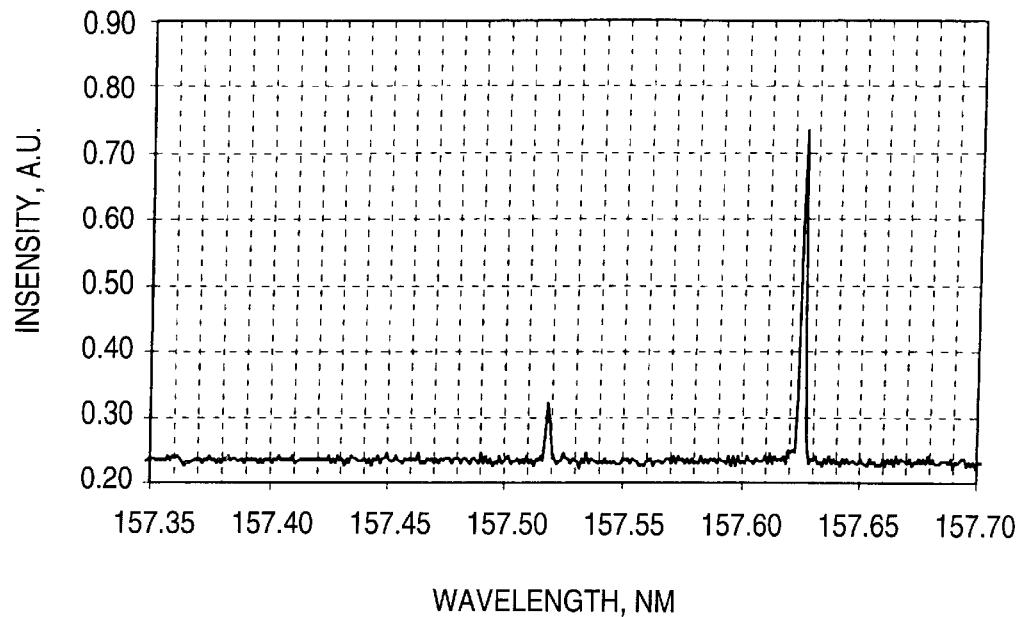
FIG. 6a shows a free-running output emission spectrum of a $F_2$-laser with helium as a buffer gas.
Figure 6B:
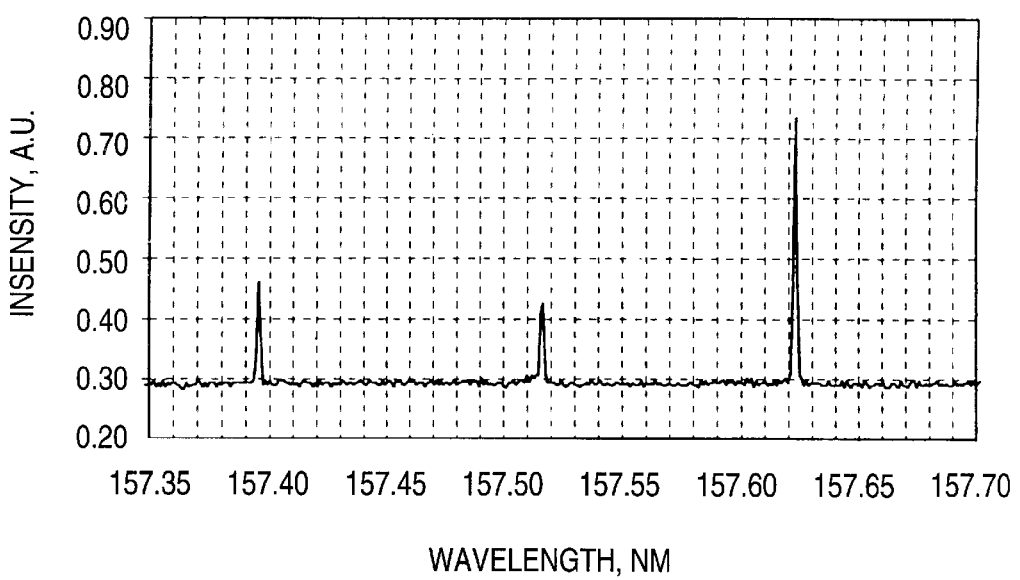
FIG. 6b shows a free-running output emission spectrum of a $F_2$-laser with neon as a buffer gas.

In addition to molecular fluorine, the gas mixture within the discharge chamber of the $F_2$-laser of the present invention further includes one or more other gases including at least one buffer gas. FIGS. 6a and 6b show spectra of the free-running $F_2$-laser with helium and neon as a buffer gas, respectively.

FIG. 6a shows the free-running $F_2$-laser spectrum around 157 nm with helium as the buffer gas. Two lines are observed. FIG. 6b shows the free-running $F_2$-laser spectrum around 157 nm with neon as the buffer gas. In this case, three lines are observed. The corresponding lines around 157.62 nm and 157.52 nm of the spectrum of FIG. 6b are notably narrower than those of the spectrum of FIG. 6a. This is because the $F_2$-laser which emitted the spectrum of FIG. 6b exhibited a longer pulse duration due to the presence of the neon buffer gas, than did the $F_2$-laser which emitted the spectrum of FIG. 6a having helium as a buffer gas.

In any embodiment of the $F_2$-laser of the present invention, the longer the pulse duration, the narrower the spectral linewidth which is achievable. On each roundtrip of the laser beam inside the resonator, there occurs a spectral filtering of the beam. After each reflection from the etalon output coupler 6, the intensity spectrum of reflected beam $I^{(j+1)}(v)$ is the product of reflectivity function of the etalon $R(v)$ and incident spectrum $I^{(j)}(v)$:

$$I^{(j+1)}(v)=R(v)I^{(j)}(v),$$

where j is the number of the round-trip. If, for example, the reflectivity function can be approximated by a Gaussian function, the width of the beam spectrum decreases as an inverse square root of the number of roundtrips:

$$\Delta v \sim j^{-1/2}.$$

Figure 7A:
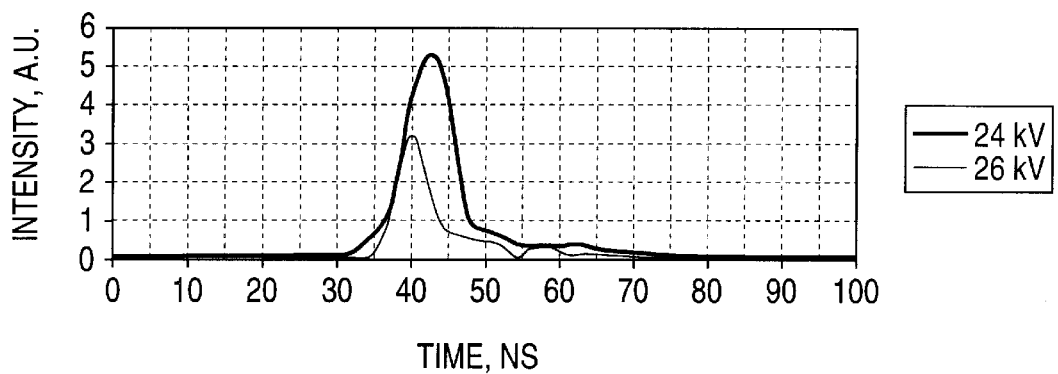
FIG. 7a shows the temporal pulse shape of a $F_2$-laser having only helium as a buffer gas.
Figure 7B:
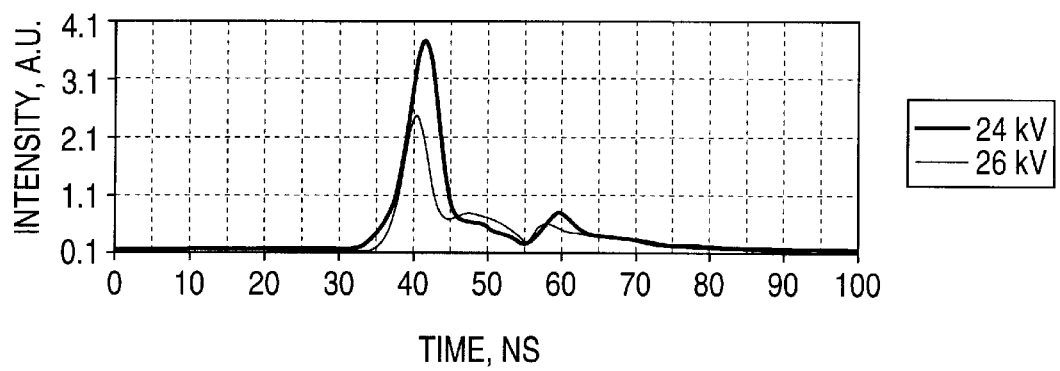
FIG. 7b shows the temporal pulse shape of a $F_2$-laser having helium and neon as buffer gases.
Figure 7C:
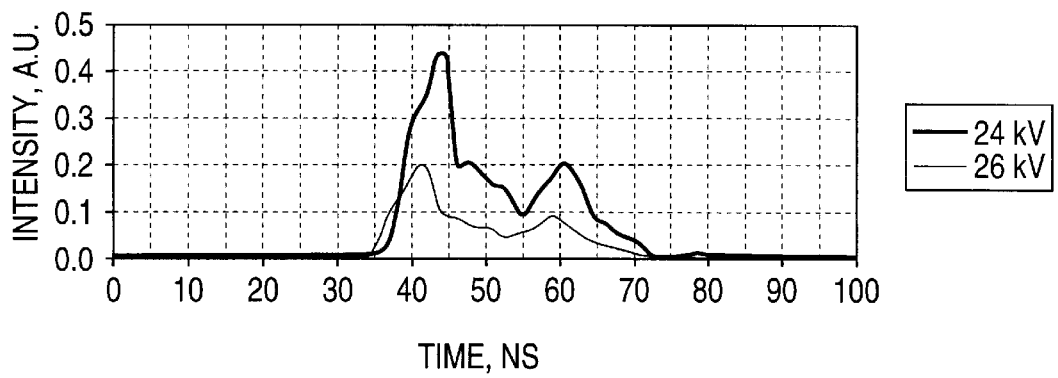
FIG. 7c shows the temporal pulse shape of a $F_2$-laser having mostly neon and only a very small concentration of helium as buffer gases.

The preferred embodiment also includes means of increasing the length of the pulse of the molecular fluorine laser by utilizing neon as a buffer gas. FIGS. 7a, 7b and 7c show the temporal pulse shape with the gas mixtures shown in Table 1:

TABLE 1

| Figure | Neon | Helium | Fluorine |
|---|---|---|---|
| 7a | 0 | 99.87% | 0.13% |
| 7b | 48.4% | 51.5% | 0.13% |
| 7c | 96.8% | 3.1% | 0.13% |

An increase in the concentration of neon in the gas mixture of the $F_2$-laser results in an increased pulse length from roughly 8 nsec (for 0% neon) to 25 nsec (for 96.8% neon).

Total Pressure and Fluorine Concentration Considerations

The gas mixtures are optimized with respect to pulse energy (gain) and pulse energy stability. Higher pressure and higher fluorine concentration each achieve a higher energy result, but also produce a higher pulse energy fluctuation. The preferred arrangement thus balances these considerations. Thus, a total pressure of approximately 5 bar and a fluorine concentration in the range 0.05% to 0.2% is preferred.

In an embodiment employing neon as the sole buffer gas, three lines are present in the free-running spectrum. The following conditions should be satisfied:

$$mv_0=v_1;$$

$$(k+1/2)v_0=v_2;$$

$$(j+1/2)v_0=v_3,$$

where m, j, k are integers, $v_0$ is the free spectral range of the etalon in the optical frequency domain, $v_1$ is the optical frequency of the line to be selected, and $v_2$ and $v_3$ are optical frequencies of spectral lines to be suppressed. In the case where only two lines present, such as if helium is used as the buffer gas, this set of equations is reduced to two equations:

$$mv_0=v_1;$$

$$(k+1/2)v_0=v_2;$$

where $v_1$ is the optical frequency of the line to be selected.

Figure 8A:
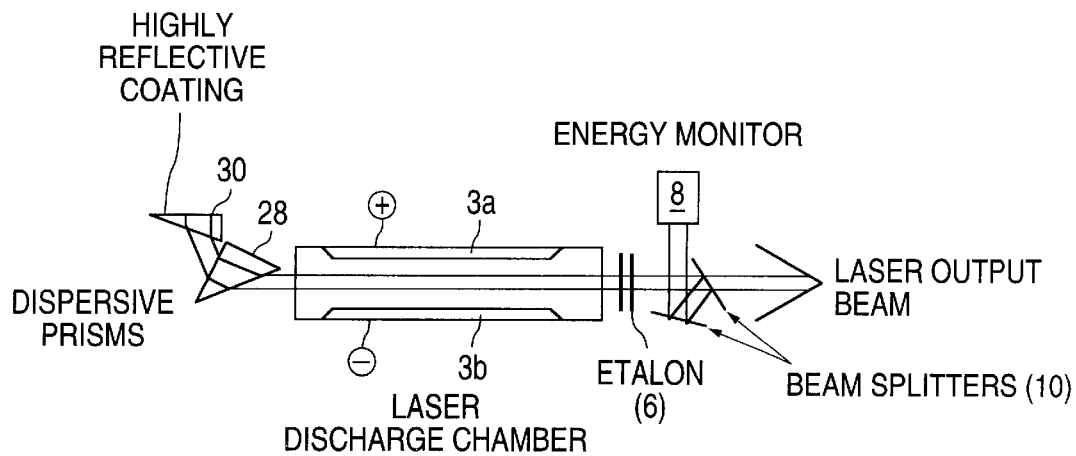
FIG. 8a shows a third embodiment of a $F_2$-laser in accord with the present invention.
Figure 8B:
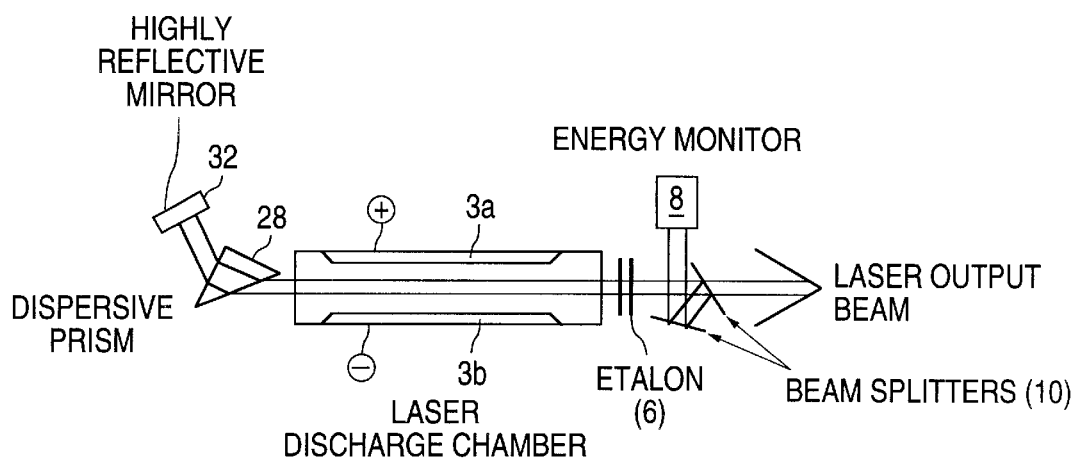
FIG. 8b shows a fourth embodiment of the present invention.

FIGS. 8a and 8b schematically show third and fourth preferred embodiments, respectively, of resonator arrangements for a molecular fluorine laser. In order to increase the wavelength separation effect, one may use multiple (two or more) prisms 28,30 as shown in FIG. 8a. The second prism 30 may have a high reflectivity coating at its back surface, or may be disposed before a highly reflective resonator reflector mirror. Use of such a separate highly reflective mirror 32 instead of the highly reflective coating on the back surface of the prism 30 is shown in FIG. 8b. Such separate highly reflective mirror 32 can be used in combination with multiple prisms as well. An advantage of the separate mirror 32 is that it can be manufactured more readily than the prism 30. At the same time, use of the separate mirror 32 increases the number of optical surfaces that the beam traverses, thus increasing both optical losses and wavelength dispersion. Consequently, a decision on the number of prisms and whether to use a separate mirror is dependent on the total magnitude of the dispersion desired for achieving reliable selection of the single line. As noted above, one or more apertures may be inserted into the resonator of either of the systems of FIGS. 8a & 8b to chop off sidebands of the dispersion spectrum of the prisms 28,30 and/or of the superposition of the etalon 6 reflectivity maximum with the selected line of the $F_2$-laser.

Figure 9A:
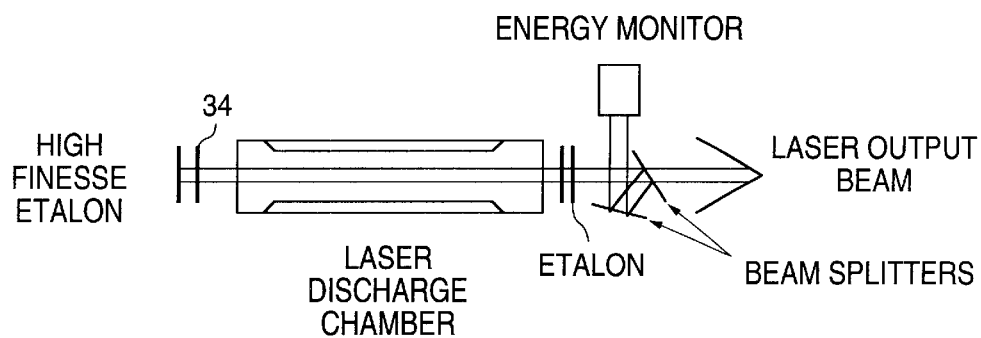
FIG. 9a shows a fifth embodiment of the present invention including a high finesse etalon.
Figure 9B:
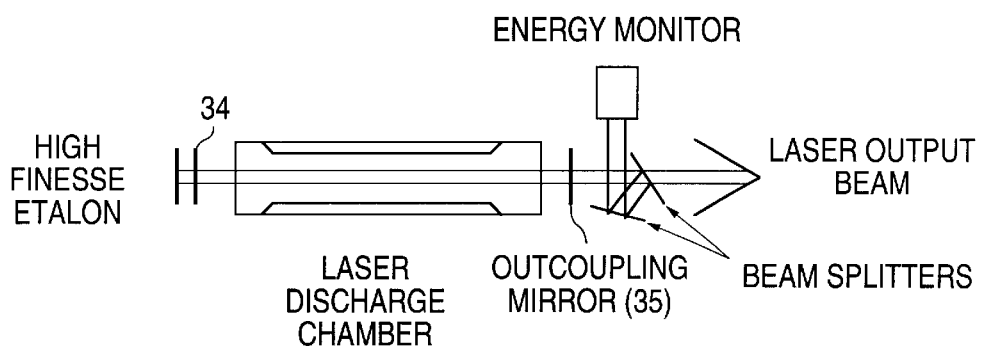
FIG. 9b shows a sixth embodiment of the present invention including a high finesse etalon.

FIGS. 9a and 9b schematically show fifth and sixth preferred embodiments, respectively, of resonator arrangements for a molecular fluorine laser emitting around 157 nm. In the fifth embodiment of FIG. 9a, a high finesse etalon 34 replaces the prism 4 of the first embodiment of FIG. 2a. In the sixth embodiment of FIG. 9b, the high finesse etalon 34 is again used, and an outcoupling mirror 35 replaces the outcoupling etalon 6 of the fifth embodiment of FIG. 9a. Generally, any of the embodiments described herein may be altered to include the high finesse etalon shown in FIGS. 9a and 9b.

In either of the fifth or sixth embodiments, line selection is achieved through the use of the etalon 34, which preferably has a relatively high finesse. The etalon 34 of FIGS. 9a and 9b works in reflection mode and may also serve to replace the high reflectivity surface of previously described embodiments, i.e., the high reflectivity back surface of the prism 4 in the first embodiment or the prism 30 in the third embodiment, the high reflectivity mirror 12 of the second embodiment or the high reflectivity mirror 32 of the third embodiment. Alternatively, the etalon 34 may operate in transmissive mode and be disposed before a highly reflective resonator reflector mirror. Further, the etalon 34 may replace the entire prism 12, 30 or prism 28 and reflector 28, due to its line selection property coupled with its high reflectivity property.

Figure 10:
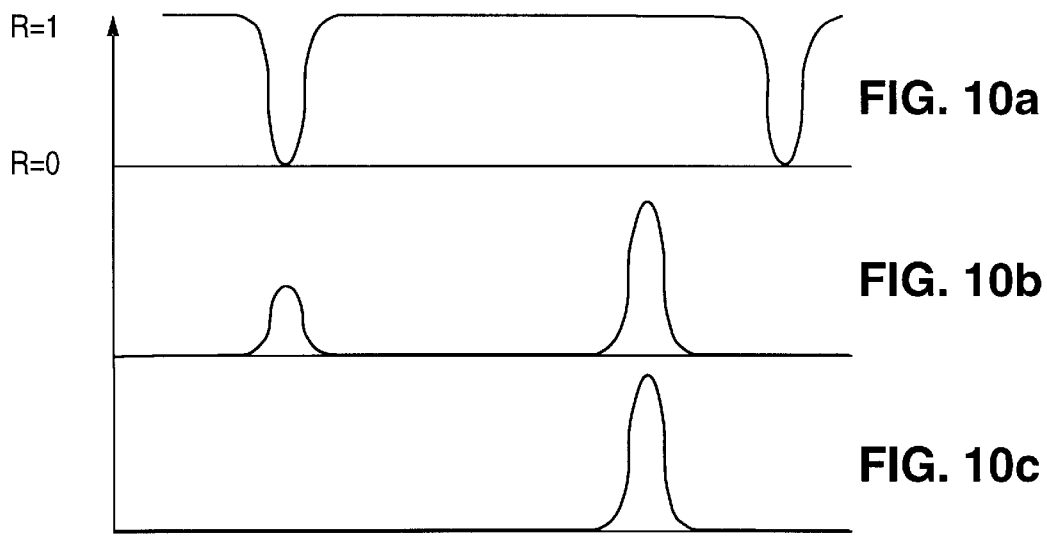

The reflectivity of the etalon 34 R versus the optical frequency v of the laser beam is shown in FIG. 10a. It is represented by the function:

$$R(v)=F\sin^2(\pi v/v_0)/(1+F\sin^2(\pi v/v_0))$$

where $F=4R/(1-R)^2$ is the finesse factor of the etalon 34, $v_0$ is the free spectral range (FSR) of the etalon, $v_0=1/2$ nL [cm$^{-1}$], where n is the refractive index of the etalon gap material and L is the spacing of the etalon in centimeters. The finesse factor F relates to the finesse as $F=\pi(F/2)^{1/2}$. Spectral components having frequencies close to the minimum of the reflectivity function of the etalon 34 suffer the greatest losses in the resonator and, therefore, are suppressed. If the finesse of the etalon 34 is sufficiently high, then any light having a frequency outside of the narrow spectral area corresponding to the condition $v=k\ v_0$, where K=integer, will be almost entirely reflected by the etalon 34, which exhibits a reflectivity of nearly unity at those frequencies, as shown in FIG. 10a. Therefore, except for these narrow areas of minimum reflection at $v=k\ v_0$, the etalon 34 acts simply as a highly reflective surface. Preferably, the etalon 34 is configured to suppress undesirable spectral lines by setting a minimum or minimums of reflectivity of the etalon 34 at the center(s) of such line(s). An etalon 34 according to either of the fifth or sixth embodiments may be either a solid-state etalon, an evacuated etalon or an inert gas filled etalon as described above, wherein the inert gas may again be one or a combination of any of helium, argon, neon, krypton, nitrogen, or another gas that does not absorb light strongly around 157 nm. Also, the gap between the plates of the etalon 34 may include solid material such as $CaF_2$, $MgF_2$, $LiF_2$, $BaF_2$, $SrF_2$, quartz or fluorine doped quartz, or another solid material that does not strongly absorb light around 157 nm.

FIG. 10a–10c illustrate the line selection feature of the high finesse etalon 34 of FIGS. 9a and 9b. FIG. 10a shows the wavelength dependence of the reflectivity of the high finesse etalon 34. FIG. 10b shows the emission spectrum of the free-running $F_2$-laser. The resulting output emission of the $F_2$-laser having the high finesse etalon 34 in its resonator setup is shown in FIG. 10c. As can be observed from FIGS. 10a–10c, one of two lines is selected as output of the $F_2$-laser, as desired.

Wavefront curvature of the beam may also be compensated by using a cylindrical lens within the resonator (see U.S. Pat. No. 6,061,382, which is hereby incorporated by reference). The etalons 6 and 34 of the present invention are generally sensitive to the wavefront curvature of the beam. Thus, one or more cylindrical lenses placed in the resonator can provide a more collimated beam at the etalon(s) 6,34. Moreover, wavefront curvature compensation can be achieved via one or more curved resonator mirrors.

Other variations are possible in furthering the goals and objects of the present invention. For example, any of the prism 4 of FIG. 2a, the highly reflective mirror 12 of FIG. 2b, the etalon 6 in any embodiment, the prism 28 or the prism 30 of FIG. 8a, the prism 28 or the highly reflecting surface 32 of FIG. 8b, and the high finesse etalon 34 of FIGS. 9a and 9b may seal off the laser discharge chamber 2. This advantageously reduces the number of optical interfaces the beam has to traverse, and thus reduces optical losses. In particular, an extra laser window or windows is not needed after one or more of the optical elements just mentioned is substituted therefor. When an etalon 6,34 is used to seal the discharge chamber, it may be advantageous to raise the pressure of the gas within the etalon 6,34 to near the pressure of the gas mixture, to prevent distortion of the etalon 6,34 due to the pressure difference, but only if the etalon may still perform its line selection and/or narrowing function.

Figure 11:
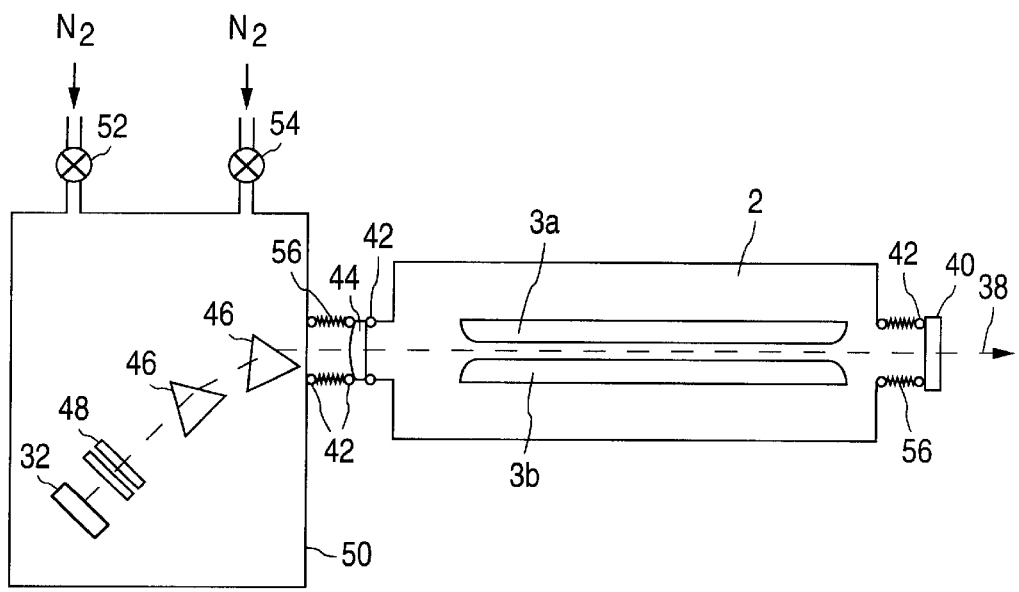
FIG. 11 shows a preferred resonator arrangement for a $F_2$-laser including an inert gas purged line-narrowing module having a beam expander and etalon for line selection and/or line narrowing.

FIG. 11 shows a seventh preferred embodiment of a resonator arrangement for a molecular fluorine ($F_2$) laser including a line-narrowing module 50 having a prism beam expander 46 and an etalon 48 for line selection and/or line narrowing. The resonator arrangement of the seventh embodiment includes a discharge chamber 2 filled with a gas mixture including molecular fluorine and one or more buffer gases such as neon and/or helium. A pair of main discharge electrodes 3a, 3b are in the discharge chamber and connected to a pulser circuit (not shown) for energizing the molecular fluorine. One or more preionization units is also within the discharge chamber (not shown, but see the Ser. No. 60/162,845 application, mentioned above). Other aspects of the discharge chamber 2 may be found at the Ser. No. 09/453,670 application and otherwise as set forth above and/or as understood by those skilled in the art.

One window 40 is a plano-parallel optical window which serves as an outcoupler. A partially reflective mirror may alternatively be used separate from the chamber window 40 for outcoupling the beam, and the window 40 serving the dual role of sealing the chamber 2 and outcoupling the beam reduces the number of optical surfaces within the resonator and thereby enhancing its efficiency. The window 40 is preferably aligned perpendicular to the optical axis, but may be oriented at an angle such as 5E or at Brewster's angle or another selected angle for achieving desired reflectivity and transmissivity characteristics and/or to prevent parasitic oscillations.

Vacuum bellow 56 or similar arrangement provides versatility in degrees of freedom of adjustment and a vacuum-tight seal. The other window 44 is preferably a plano-convex lens serving to compensate the wavefront curvature as described in U.S. Pat. No. 6,061,382 and European Patent Application EP 00955706 A1, each of which is assigned to the same assignee and is hereby incorporated by reference. Tightness of the seal is ensured by seals 42. The lens 44 may or may not be adjustable. The lens 44 may be tilted slightly off the normal to the beam (5 degrees or so) in order to avoid parasitic oscillations. Preferably, this lens 44 is anti-reflectively coated.

The resonator of the $F_2$-laser according to the seventh embodiment shown at FIG. 11 includes a line-selection and/or line-narrowing unit coupled with the chamber 2 via the bellows 56 and seals 42. The beam is preferably expanded by one or more beam expansion prisms 46 in order to reduce its divergency. Several prisms 46 may be used, and a converging diverging lens pair may be used or other beam expansion means known to those skilled in the art.

A transmissive etalon is preferably positioned after the beam expander prisms 46 and serves as a wavelength selector. Finally, highly reflecting mirror 32 returns the beam back through the resonator.

The line-narrowing unit is within an enclosure 50 that is coupled to the laser chamber 2 using a bellows 56 and seals 42 such that the line-narrowing unit of the laser resonator is sealed from the outer atmosphere. A inert purge gas is flowed through the enclosure 50 via inert and outlet ports 52, 54. A vacuum port may be included or a pump can be connected via either port 52 or 54. A method for controlling the atmosphere in the enclosure may be to maintain the enclosure under evacuated conditions using a pump, or to flow the purge gas rapidly through the enclosure 50, or preferably to first evacuate the enclosure and then to flow the purge gas at a low flow rate. An evacuation may be followed by a backfill of the purge gas and the procedure may be repeated a number of times, e.g., 3–10 times, before the purge gas is flowed at a low rate. For more details and alternative procedures for preparing and maintaining the atmosphere of the enclosure, see U.S. patent applications Ser. Nos. 09/343,333, 09/594,892 and 09/598,522, each of which is assigned to the same assignee as the present application and is hereby incorporated by reference (relating to an enclosure for a beam delivery path and diagnostic beam splitter module for an $F_2$-laser).

The entire beam path between the chamber 2 and the highly reflective mirror 32 is in fact preferably enclosed within the enclosure 50 which is purged with some inert gas such as preferably nitrogen, or helium, argon, krypton or the like. High purity nitrogen is preferably used for this purpose.

The pressure of the nitrogen in the enclosure 50 may be adjustable, and by changing the pressure of nitrogen, one can adjust the transmission spectrum of the etalon 48 (see, e.g., U.S. patent application Ser. No. 09/178,445, relating to pressure tuning a line-narrowing unit including a grating and beam expander, which is assigned to the same assignee and is hereby incorporated by reference). The maximum of transmission of the etalon 48 is preferably adjusted to coincide with a maximum in the primary line at $\lambda_1$ around 157.62 nm, among multiple lines around 157 nm including also a secondary line around 157.52 nm which is preferably suppressed, of the natural emission spectrum of the free-running $F_2$ laser.

Figure 12A:
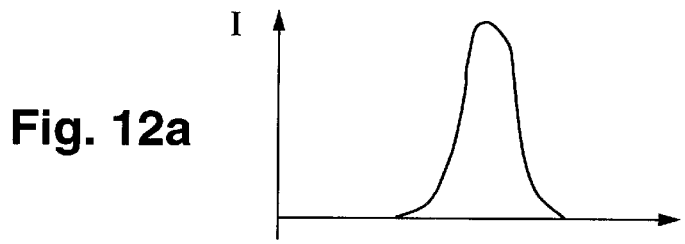
FIGS. 12a–12c illustrate how an etalon may be adjusted to narrow a selected line of the $F_2$-laser of the embodiment of FIG. 11.
Figure 12B:
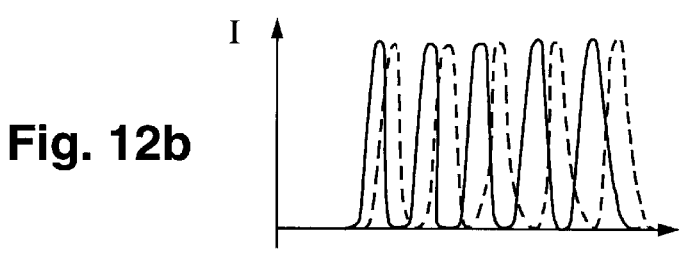
Figure 12C:
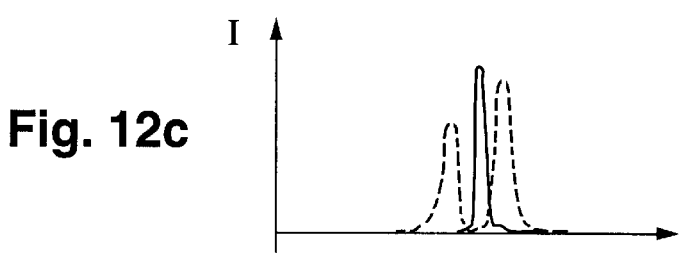

FIGS. 12a–12c illustrate how an etalon may be adjusted to narrow a selected line, e.g., the primary line around 157.62 nm, of the $F_2$-laser of the embodiment of FIG. 11. FIG. 12a illustrates the natural emission spectrum of the primary line around 157.62 nm of the $F_2$ laser. The transmission of the etalon 48 is a periodic function of the wavelength as illustrated at FIG. 12b. The solid line in FIG. 12b represents a first tuning position of the etalon 48 and the dashed line represents a second tuning position of the etalon 48. The etalon 48 may be tuned piezo-electrically, rotationally and/or by adjusting the pressure within the gap between its plates, either as set forth above with respect to the discussion of FIG. 11 or with respect to the discussion of FIG. 4. One way of varying the pressure is to control intake and escape rates of the nitrogen purge gas shown at FIG. 11 using needle valves 52 and 54. Closing output valve 54 and/or opening inlet valve 52, e.g., causes the pressure to rise, and visa versa.

Since the width of each transmission peak is roughly the free spectral range of the etalon divided by its finesse, and the finesse is limited by the quality of optical surfaces, it is preferred to reduce the free spectrum range as much as possible in order to minimize the width of the transmission peak. The minimum free spectral range is determined by the requirement that the peaks that are adjacent to the central peak, substantially do not produce oscillations. As the approximate natural bandwidth of the emission peak illustrated at FIG. 12a is roughly 0.6 pm to 1.0 pm, the preferred, optimal free spectral range is about 1.0 pm. The solid lines shown at FIG. 12b and FIG. 12c illustrate a preferred spectral alignment, wherein FIG. 12c shows a single narrowed peak. The dashed lines of FIG. 12b and FIG. 12c illustrate an undesirable spectral alignment because two peaks are shown including the occurrence of a second peak in the laser output when transmission spectrum of the etalon 48 is shifted from the optimum shown by the solid lines.

Variations of the seventh embodiment may include having an outcoupler as a separate optical element from the window 40, with the output window 40 of the chamber 2 being a piano-piano window. This provides an opportunity to mount resonator optics onto a mechanically stable structure, decoupled from the chamber 2. However, this increases optical losses and reduces the efficiency of the laser. A second etalon, a grating and/or one or more dispersive prisms may be included with the line-narrowing unit of FIG. 11. The etalon 48 may be replaced with a reflective etalon to serve a dual role as a line selection element and as a resonator reflector, such as a high or low finesse etalon such as those etalons 6, 34 described above.

The described laser oscillator typically produces lower output power, as compared to the free-running resonator. Therefore, an amplifier may be used in the seventh embodiment, as with any of the first to sixth embodiment, as described above and at the Ser. No. 09/599,130 application, which has been incorporated by reference above.

The preferred material for all optical elements is $CaF_2$, and $MgF_2$, $BaF_2$, $SrF_2$, $LiF_2$ or LiF among a few other materials known to be adequately transmissive at 157 nm may alternatively be used. The etalon 48 preferably has each of its internal surfaces coated with a thin film dielectric coating having a reflectivity above 50% and preferably between 90% to 97%, whereas the outside surfaces of the etalon 48 are preferably anti-reflectively coated.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, steps are provided in a selected order for typographical convenience only and not to imply any particular order for performing the steps. Thus, the steps may be performed in a variety of orders within the scope of those claims, unless a particular order is otherwise expressly indicated or understood by those skilled in the art as being necessary. For example, in some method claims that follow, steps of selecting one of plural lines and narrowing the selected line may be performed in either or a combination of temporal orders as the beam traverses line-narrowing and/or selection elements and is outcoupled from the laser resonator.

What is claimed is:

1. A $F_2$-laser, comprising:
   a discharge chamber filled with a gas mixture including molecular fluorine for generating a spectral emission including a plurality of closely spaced lines in a wavelength range between 157 nm and 158 nm including a primary line and a secondary line;
   a plurality of electrodes coupled with a power supply circuit for producing a pulsed discharge to energize said molecular fluorine; and
   a resonator including the discharge chamber, a transmissive etalon, and a pair of resonator reflectors for generating a laser beam having a bandwidth of around 1 pm or less, said etalon being configured for having a response maximum around the primary line for maximum transmissivity of said primary line and having a response minimum around the secondary line for relatively low transmissivity of said secondary line to substantially suppress said secondary line, thereby selecting said primary line such that said $F_2$-laser emits a single wavelength laser beam having a narrow spectral linewidth that is less than the bandwidth of a free-running $F_2$-laser to provide a narrow band VUV laser beam.

2. The $F_2$-laser of claim 1, wherein said transmissive etalon further being configured for having the response maximum around the line, wherein the response maximum of the etalon has a spectral width less than that of the primary line, such that the etalon has a substantially reduced response around outer portions of the primary line for relatively low transmissivity of said outer portions of said primary line to substantially suppress said outer portions of said primary line, thereby narrowing said primary line such that said $F_2$-laser emits a single wavelength laser beam having a narrow spectral linewidth that is less than the linewidth of the primary line of a free-running $F_2$-laser to provide a narrow band VUV laser beam.

3. An $F_2$-laser as in claim 2, further comprising a second etalon for further narrowing the primary line, said second etalon being arranged for maximum transmissivity of a central portion of the selected portion of the primary line transmitted by the first etalon, and for relatively low transmissivity of outer portions of the selected line, to suppress said outer portions.

4. An $F_2$-laser as in claim 2, further comprising a second etalon for further narrowing the primary line, said second etalon being arranged as a resonator reflector for maximum reflectivity of a central portion of the selected portion of the primary line transmitted by the first etalon, and for relatively low reflectivity of outer portions of the selected line, to suppress said outer portions.

5. An $F_2$-laser as in claim 4, said second etalon being part of the resonator further for outcoupling a laser beam.

6. An $F_2$-laser as in claim 4, said second etalon being part of the resonator for reflecting a laser beam as a highly reflective resonator reflector.

7. A $F_2$-laser as in claim 2, wherein the first etalon includes two plates with an external surface of at least one of the two plates having an antireflective coating thereon for minimzing said reflectivity of said beam therefrom.

8. An $F_2$-laser as in claim 2, further comprising a prism arranged at a particular orientation for dispersing the plurality of closely-spaced lines including the primary and secondary lines such that only the primary line remains within an acceptance angle of the resonator and any other line(s) including the secondary line are dispersed outside of the acceptance angle of the resonator.

9. An $F_2$-laser as in claim 2, further comprising a prism beam expander before said etalon for expanding the cross-sectional dimension of said beam that is incident on said etalon such that a divergence of said beam is reduced before being incident upon said etalon.

10. A $F_2$-laser as in claim 1, wherein said gas mixture further includes a buffer gas including neon.

11. A $F_2$-laser as in claim 1, wherein said first etalon includes two plates separated by a gap and said first etalon is in a housing filled with an inert gas.

12. An $F_2$-laser as in claim 11, said gas within said housing having a controlled pressure for pressure tuning said etalon.

13. A $F_2$-laser as in claim 1, wherein said etalon is configured to be rotatable for rotation tilting of said etalon.

14. A $F_2$-laser as in claim 1, wherein said etalon is coupled with a piezo for piezo-electrically tuning said etalon.

15. A $F_2$-laser as in claim 1, wherein said first etalon includes two plates separated by a gap, wherein said plates comprise a material selected from the group of materials consisting of $CaF_2$, $MgF_2$, LiF, $BaF_2$, $SrF_2$, quartz and fluorine doped quartz.

16. A $F_2$-laser as in claim 2, further comprising a second etalon for further narrowing the primary line, said second etalon being arranged for having a response maximum around a selected portion of the primary line for maximum transmissivity of the selected portion of the portion of the primary line transmitted by the first etalon, and for having a substantially reduced response around outer portions of the portion of the primary line transmitted by the first etalon for relatively low transmissivity of the outer portions of the portion of the primary line transmitted by the first etalon, to suppress said outer portions.

17. A $F_2$-laser as in claim 2, furter comprising a second etalon for furter narrowing the primary line, said second etalon being arranged as a resonator reflector and for having a response maximum around a selected portion of the primary line for maximum reflectivity of the selected portion of the portion of the primary line transmitted by the first etalon, and for having a substantially reduced response around outer portions of the selected portion for relatively low reflectivity of the outer portions of the portion of the primary line transmitted by the first etalon, to suppress said outer portions.

18. An $F_2$-laser as in claim 17, said second etalon being part of the resonator further for outcoupling a laser beam.

19. An $F_2$-laser as in claim 17, wherein said second etalon includes two plates with one of the two plates having a highly reflective inner surface for reflecting a laser beam as a highly reflective resonator reflector.

20. A $F_2$-laser as in claim 1, wherein said first etalon is a low finesse etalon.

21. A $F_2$-laser, comprising:
a discharge chamber filled with a gas mixture including molecular fluorine for generating a spectral emission including a plurality of closely spaced lines in a wavelength range between 157 nm and 158 nm including a primary line and a secondary line;
a plurality of electrodes coupled with a power supply circuit for producing a pulsed discharge to energize said molecular fluorine; and
a resonator including the discharge chamber and further including a prism and a first etalon, said prism being arranged at a particular orientation for dispersing the plurality of closely-spaced lines including the primary and secondary lines such that only the primary line remains within an acceptance angle of the resonator and any other line(s) including the secondary line are dispersed outside of the acceptance angle of the resonator such that only the primary line is amplified among said plurality of closely-spaced lines, said first etalon being arranged for having a response maximum around a selected portion of the pi line, wherein the response maximum of the etalon has a spectral width less than that of the primary line, such that the etalon has a substantially reduced response around outer portions of the primary line, for maximum transmissivity of the selected portion of the primary line and for having a substantially reduced response relative to the response maximum around outer portions of the primary line for relatively low transmissivity of the outer portions of the primary line to substantially suppress said outer portions, thereby narrowing the primary line such that said $F_2$-laser emits a single wavelength laser beam having a narrow spectral linewidth that is less than the linewidth of the primary line of a free-running $F_2$-laser to provide a narrow band VUV laser beam.

22. An $F_2$-laser as in claim 21, said prism having a highly reflective back surface for reflecting a laser beam as a highly reflective resonator reflector.

23. An $F_2$-laser as in claim 21, said prism being disposed between resonator reflector elements of said resonator and having at least one antireflective coating on a beam entry/exit surface for reducing reflection of said beam from said surface.

24. An $F_2$-laser as in claim 21, said prism being disposed between resonator reflector elements of said resonator and having an antireflective coating on each beam entry/exit surface for reducing reflection of said beam from each said beam entry/exit surface.

25. An $F_2$-laser as in claim 21, said etalon including two substantially parallel plates with internal surfaces of said plates each having a dielectric coating thereon for increasing the reflectivities of said internal surfaces.

26. A $F_2$-laser as in claim 21, said etalon including two substantially parallel plates with outer surfaces of said plates each having an antireflective coating thereon reducing the reflectivity of said outer surfaces.

* * * * *